United States Patent
Lohner et al.

(10) Patent No.: US 6,834,494 B2
(45) Date of Patent: Dec. 28, 2004

(54) DESIGN AND ASSEMBLY OF A CATALYST BED GAS GENERATOR FOR THE CATALYTIC DECOMPOSITION OF HIGH CONCENTRATION HYDROGEN PEROXIDE PROPELLANTS AND THE CATALYTIC COMBUSTION OF HYDROCARBON/AIR MIXTURES

(75) Inventors: Kevin A. Lohner, Los Angeles, CA (US); Jeffrey A. Mays, Woodland Hills, CA (US); Kathleen M. Sevener, Los Angeles, CA (US)

(73) Assignee: The Boeing Company, Chicago, IL (US)

( * ) Notice: Subject to any disclaimer, the term of this patent is extended or adjusted under 35 U.S.C. 154(b) by 29 days.

(21) Appl. No.: 10/404,934

(22) Filed: Apr. 1, 2003

(65) Prior Publication Data

US 2004/0197247 A1 Oct. 7, 2004

(51) Int. Cl.[7] .................................................. F02K 9/68
(52) U.S. Cl. .................... 60/218; 60/227; 29/890.01
(58) Field of Search .......................... 60/227, 218, 723; 29/890.01

(56) References Cited

U.S. PATENT DOCUMENTS

| | | | | | |
|---|---|---|---|---|---|
| 3,488,962 | A | * | 1/1970 | McCormick | 60/218 |
| 6,116,014 | A | * | 9/2000 | Dalla Betta et al. | 60/777 |
| 6,289,667 | B1 | * | 9/2001 | Kolaczkowski et al. | 60/777 |
| 6,532,741 | B2 | * | 3/2003 | Watkins | 60/723 |
| 6,652,248 | B2 | * | 11/2003 | Watkins et al. | 417/381 |

* cited by examiner

Primary Examiner—Ehud Garenberg
(74) Attorney, Agent, or Firm—Artz & Artz, P.C.

(57) ABSTRACT

A method for designing and assembling a high performance catalyst bed gas generator for use in decomposing propellants, particularly hydrogen peroxide propellants, for use in target, space, and on-orbit propulsion systems and low-emission terrestrial power and gas generation. The gas generator utilizes a sectioned catalyst bed system, and incorporates a robust, high temperature mixed metal oxide catalyst. The gas generator requires no special preheat apparatus or special sequencing to meet start-up requirements, enabling a fast overall response time. The high performance catalyst bed gas generator system has consistently demonstrated high decomposition efficiency, extremely low decomposition roughness, and long operating life on multiple test articles.

45 Claims, 3 Drawing Sheets

DESIGN AND ASSEMBLY OF A CATALYST BED GAS GENERATOR FOR THE CATALYTIC DECOMPOSITION OF HIGH CONCENTRATION HYDROGEN PEROXIDE PROPELLANTS AND THE CATALYTIC COMBUSTION OF HYDROCARBON/AIR MIXTURES

TECHNICAL FIELD

This invention described herein was made in the performance of work under NASA contract No. NCC8-193 and is subject to the provisions of Section 305 of the National Aeronautics and Space Act of 1958 (72 Stat. 435: 42 U.S.C. 2457).

TECHNICAL FIELD

The present invention generally relates to propulsion systems and more specifically to gas generator design and assembly for the catalytic decomposition of high concentration hydrogen peroxide and the catalytic combustion of hydrocarbon/air mixtures.

BACKGROUND ART

Safer, less toxic propellants that meet operational performance requirements have long been sought by the propulsion industry. The commitment to increasingly safer and lower cost orbit space operations, as evidenced by a central charter of the Space Launch Initiative, has made success in testing less toxic propellants more imperative than ever. Less toxic propulsion systems are being developed to replace engine systems that use more hazardous propellants, such as Nitrogen Tetroxide (NTO) and Monomethyl Hydrazine (MMH).

Hydrogen peroxide offers many potential benefits as a non-toxic propellant source for target, space, and on-orbit applications. Hydrogen peroxide can be decomposed by passing it over a catalyst. The catalyst bed decomposes the hydrogen peroxide to produce super-heated steam and oxygen. The hot gases can be used to drive gas turbines, provide thrust as a monopropellant, provide an oxidizer for bi-propellant systems, or function as an igniter for a rocket engine when combined with fuels like kerosene.

Ninety-eight (98%) percent hydrogen peroxide is an excellent oxidizer for many space applications, both in monopropellant and bipropellant systems, because it is non-cryogenic, has high density, and can be used as a regenerative coolant. However, the high adiabatic decomposition temperature of 98% hydrogen peroxide (1734 degrees Fahrenheit at one atmosphere, versus 1364 degrees Fahrenheit for 90% hydrogen peroxide) and the increase in volume due the temperature increase and phase change from a liquid to a gas creates difficulties in making a practical gas generator using this propellant.

In the past, hydrogen peroxide catalyst beds have been plagued with performance problems such as decomposition pressure instabilities, shorter-than predicted life, delayed starts, and low c* (catalytic decomposition) efficiency. Even the best catalyst, if not packed into a proper configuration, will have poor performance. The catalyst screens must be configured into a packed catalyst bed in a very-specific manner in order to yield smooth decomposition, long life, quick starts (without pre-heat), and high decomposition efficiency. There are many variables, including fluid distribution plate design, bed dimensions, screen type, screen positioning, number of screens, assembly sequence, and pack pressure that have a profound effect on performance.

Typical gas generators for high concentration hydrogen peroxide are prone to pressure oscillations associated with the decomposition process. The pressure oscillations tend to manifest within the catalyst bed and can be amplified by the inherent design and installation of the gas generator within a system.

Therefore, there is a need for a gas generator incorporating a high temperature catalyst system in a design which significantly mitigates the pressure oscillations of the decomposition process of high concentration hydrogen peroxide.

Further, a similar need exists for gas generator that may be used for the catalytic combustion of hydrocarbon/air mixtures. Such a catalyst system could be used in the power generation or automotive industries for emission control applications.

SUMMARY OF THE INVENTION

The present invention proposes a design and an assembly method for a high performance catalyst bed gas generator. The catalyst bed within the gas generator decomposes high temperature propellants and consists of multiple screen sections contained between an injector plate and an aft distribution plate within a cartridge housing. The multiple screen sections include a diffuser screen section, an initiator screen section, an active screen section having either a Type I or Type II mixed metal oxide (MMO) catalyst composition, and preferably a thermal screen section. The catalyst bed design is suitable for efficiently and reliably decomposing up to about 99% hydrogen peroxide propellants and withstanding the hot gas environment for durations in excess of 10,000 seconds.

The axial flow packed catalyst bed of the present invention exhibits smooth decomposition, long life, quick starts (without pre-heat), and high c* (catalytic decomposition) efficiency.

The design and assembly of the present invention is also available for other propellant systems that involve similar decomposition processes. For example, the Type II catalyst systems described above may also be used in propellant systems involving the decomposition of methane or other gaseous materials.

Other objects and advantages of the present invention will become apparent upon considering the following detailed description and appended claims, and upon reference to the accompanying drawings.

BEST MODES FOR CARRYING OUT THE INVENTION

Figure 1:
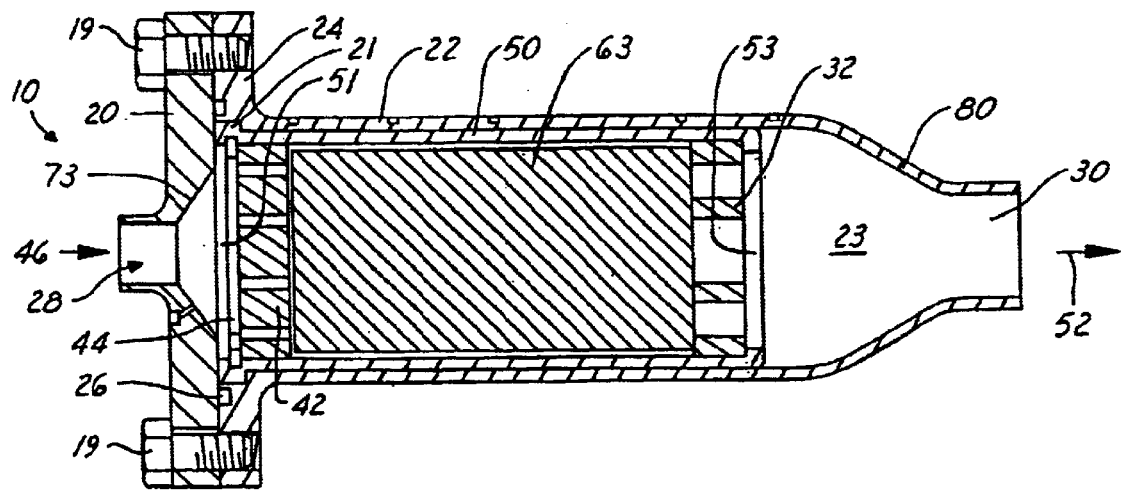
FIG. 1 illustrates a section view of a gas generator assembly according to one preferred embodiment of the present invention.

FIG. 1 illustrates one preferred embodiment of a gas generator assembly 10 used to decompose hydrogen peroxide liquid 46 to steam and oxygen (high temperature gas 52), that can be subsequently used to drive gas turbines, provide thrust as a monopropellant, provide an oxidizer for bi-propellant systems, or function as an igniter for a rocket engine when combined with fuels like kerosene.

Referring now to FIG. 1, a schematic of a gas generator assembly 10 is shown as having an inlet adapter 20 and a housing 22 coupled together utilizing a plurality of bolts, here shown as a pair of bolts 19. A seal 26 is also introduced between the inlet adapter 20 and the housing 22. The inlet adapter 20 has an inlet region 28, while the housing 22 has an outlet region 30. An optional catalyst bed cartridge 50 having a catalyst bed 63 is secured within the hollow inner region 23 of the housing 22 between an inlet 51 and an outlet 53 such that a flange portion 21 of the catalyst bed cartridge 50 is secured within the flange inlet portion 24. In other alternative embodiments not utilizing a cartridge 50, the catalyst bed 63 may be secured within the hollow inner region 23 of the housing 22 directly.

Figure 2:
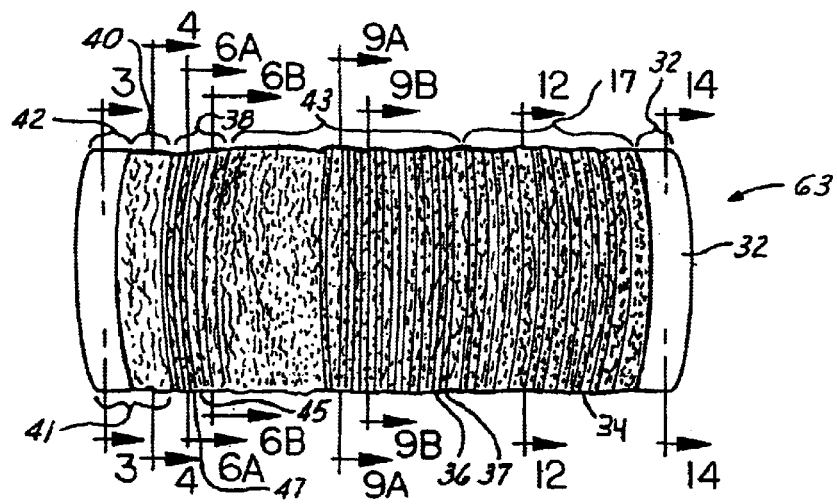
FIG. 2 is a perspective view of the catalyst bed of FIG. 1.

As best shown in FIG. 2, the catalyst bed 63 is preferably assembled by first securing the aft distribution plate 32 to the catalyst bed cartridge 50 near the outlet 53 (shown on the right-hand side of FIG. 2). Coarse-mesh thermal screens 34 are stacked against the aft distribution plate 32 to form the thermal bed section 17 of the catalyst bed. The screens 34 are added one at a time and clocked between 1 and 20 degrees clockwise or counterclockwise to the most recently added thermal screen 34. At even intervals during the addition of the thermal screens 34, a nominal bed pressure is applied to the screen 34 stack to compact the stack. After the requisite number of thermal screens 34 have been added to the catalyst bed 63, active catalyst screens 36 are then stacked alternately with inactive screens 37 to form an active catalyst screen stack 43 of the catalyst bed 63. Each screen 36, 37 is clocked 1 to 20 degrees from the most recently added screen 36, 37 and at even intervals the stack 43 is compressed to a nominal bed pressure. After the requisite number of active/inactive screen pairs 36, 37 have been added to form the stack 43, silver initiator screens 45 are stacked alternately with inactive screens 47 to form the initiator section 38 of the catalyst bed 63. Again, each screen 45, 47 is clocked and at even intervals the stack is compressed. After the requisite number of initiator/inactive screen pairs 45, 47 have been added, diffuser screens 40 are stacked onto the initiator section 38 of the catalyst bed 63. Each screen 40 is clocked and may be compressed, if necessary. The injector plate 42 is then installed and the entire bed 63 is preloaded to a nominal bed pressure, using a retainer ring 44 to lock the injector plate 42 in place at a position near the inlet 51.

The screen types selected for assembly of the catalyst bed 63 determine the proper flow performance of the catalyst pack. Wire diameters, mesh sizes, and percent open areas of each layer in the catalyst pack 63 are carefully chosen to yield the proper flow resistance and optimal amount of tortuosity. The injector plate 42 hole 56 pattern must be properly designed to uniformly distribute the liquid peroxide 46 into the catalyst bed 63 with a prescribed delta-P and injection velocity.

After the catalyst bed 63 has been installed in the catalyst bed cartridge 50 (or within the housing 22 in systems not utilizing a cartridge 50) and the injector plate 42 is locked in place, the cartridge 50 is installed within the housing 22 such that the injector plate 42 is closely coupled with the gas generator inlet region 24 and the aft distribution plate 32 is adjacent to the hollow inner region 23 of the housing 22. The catalyst bed 63, with or without the cartridge 50, configuration is thus designed for efficiently and reliably decomposing up to about 99% hydrogen peroxide and withstanding a hot gas environment for durations in excess of 10,000 seconds. The catalyst bed cartridge 50 could be a fixed or replaceable cartridge.

Figure 3:
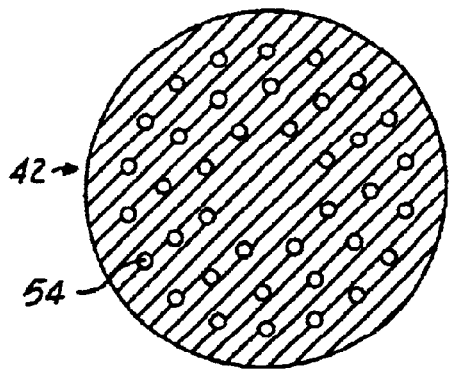
FIG. 3 is a section view of the injector plate of FIG. 2 taken along line 3—3.

As best seen in FIG. 3, the injector plate 42 has a series of injector plate holes 54 drilled through the plate thickness. The number, size and location of the injector plate holes 54 are designed to distribute the liquid propellant 46 evenly throughout the cross-section of the catalyst bed cartridge 50 as the propellant 46 flows axially from the inlet region 24 towards the outlet region 30. Preferably, the cross-sectional area of the holes 54 is between approximately 5 and 35% of the total cross-sectional area of the injector plate 42.

Figure 4:
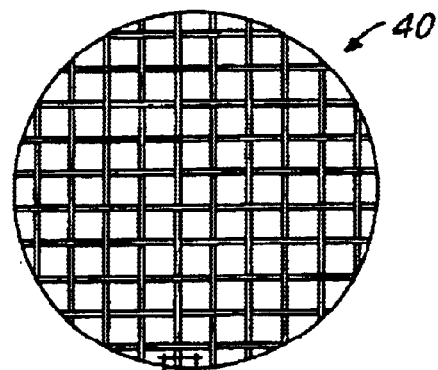
FIG. 4 is a section view of a diffuser screen of FIG. 2 taken along line 4—4.
Figure 5:
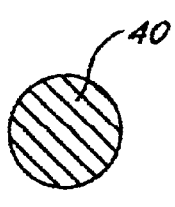
FIG. 5 is a section view of the diffuser screen of FIG. 4 taken along line 5—5.
Figure 6A:
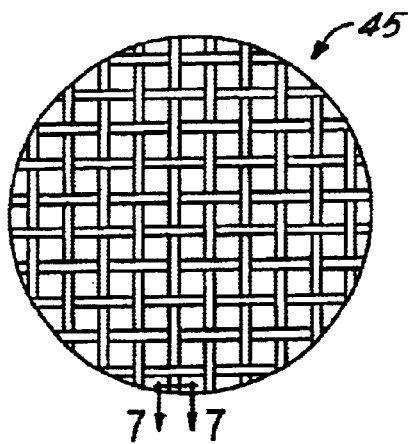
FIG. 6A is a section view of an active silver initiator screen of FIG. 2 taken along line 6A—6A.
Figure 6B:
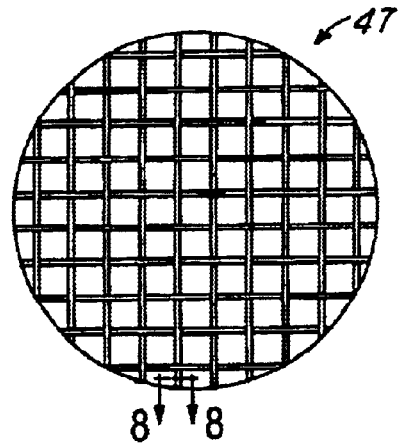
FIG. 6B is a section view of an inactive initiator screen of FIG. 2 taken along line 6B—6B.

As best seen in FIGS. 4 and 5, the diffuser screens 40 are composed of wire mesh material that is designed to further distribute and decelerate (i.e. diffuse) the liquid propellant 46 as it flows into the initiator section 38 of the catalyst bed 63. Preferably, approximately fifteen diffuser screens 40 are used in this capacity. The preferred wire mesh materials for the diffuser screens 40 are Type 316 stainless steels that have high melting temperatures and oxidation resistance. Three preferred stainless steels that meet these criteria include CRES 316, CRES 347 and CRES 304, manufactured by Allegheny Ludlum. (All referenced alloys are available in wire mesh screen form from Screen Technology Group, Inc. of Washougal, Wash.) The preferred wire mesh size for the diffuser screens 40 is between 10 and 100 mesh.

Together, the diffuser screens 40 and injector plate 42 comprise a diffuser section 41 that ensures a even distribution of the liquid propellant 46 across the entire cross-section of the catalyst bed cartridge 50, which leads to optimal decomposition efficiency.

Figure 7:
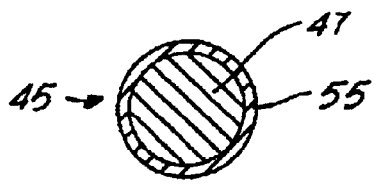
FIG. 7 is a section view of the active silver initiator screen of FIG. 6A taken along line 7—7.
Figure 8:
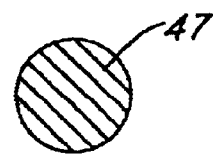
FIG. 8 is a section view of the inactive initiator screen of FIG. 6B taken along line 8—8.

As best seen in FIGS. 6A, 6B, 7 and 8, the silver initiator screens 38 are actually composed of alternating pairs of silver-plated (or wrought silver) metal mesh screens 45 (silver-plated screens shown in FIGS. 6A and 7) and inactive (i.e. not silver) metal mesh screens 47 (shown in FIGS. 6B and 8) designed to initiate decomposition of the liquid propellant 46. As best seen in FIG. 7, the silver-plated screens have a layer of silver 55 plated to the metal mesh screens 47. Within the initiator section 38, a portion of the liquid propellant 46 is decomposed generating steam and oxygen. The decomposition products elevate the temperature of the remaining unreacted liquid hydrogen peroxide 46. This elevated temperature makes the hydrogen peroxide 46 more reactive to the mixed metal oxide ("MMO") catalyst (shown as 62 on FIG. 10). The number of silver initiator screens 45 is limited to maintain a substantial portion of the propellant 46 in liquid form. Because it is desirable that the majority of the hydrogen peroxide 46 remain in a liquid state entering the MMO catalyst screens 36, it is necessary to limit the number of pairs of silver-plated (or wrought silver) metal mesh screens 45 and plain metal mesh screens 47. Preferably, no more than approximately eight pairs of screens 45, 47 are utilized in the initiator section 38 of the catalyst bed 63.

Figure 9A:
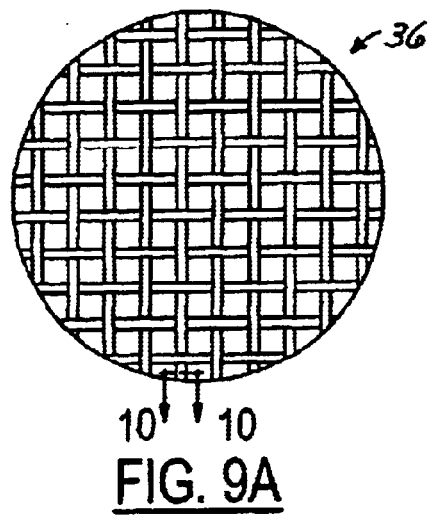
FIG. 9A is a section view of an active mixed metal oxide catalyst screen of FIG. 2 taken along line 9A—9A.
Figure 9B:
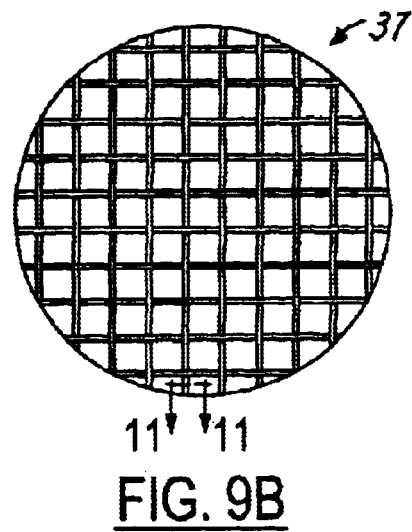
FIG. 9B is a section view of a inner metal wire substrate screen of FIG. 2 taken along line 9B—9B.
Figure 10:
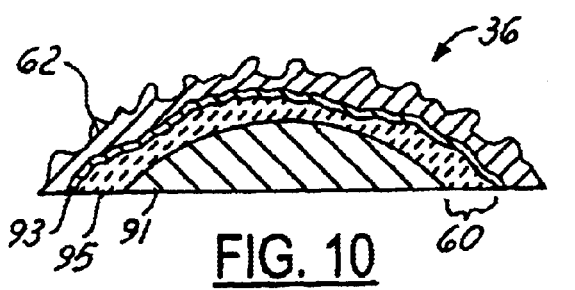
FIG. 10 is a partial section view of the a mixed metal oxide catalyst screen of FIG. 9A taken along line 10—10.
Figure 11:
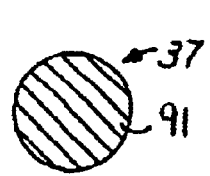
FIG. 11 is a section view of the inner metal wire substrate screen of FIG. 9B taken along line 11—11.

As best shown in FIGS. 9A and 10, each active catalyst screen 36 is preferably formed of prepared substrate screen 60 coated with an MMO catalyst 62. Coupled between each active MMO screen 36 is an inactive metallic wire substrate screen 37, shown in FIGS. 9B and 11, without any coating. Preferably, as best shown in FIG. 2, about forty-seven pairs of MMO catalyst screens 36 are utilized within the cartridge 50 of FIG. 1 to ensure complete decomposition of the hydrogen peroxide propellant 46 to the high temperature gas 52. However, the actual number of pairs of MMO catalysts screens 36 is dependent upon numerous factors, including for example the amount of silver initiator screens 38, the size of the catalyst cartridge 50, and the flow rate of the propellant 46 across the catalyst bed 63.

As described in co-pending U.S. Application No. 10/404,935, in the preferred embodiment of his invention, the prepared substrate screen 60 is an inner metallic substrate screen 91 having an optional intermediate noble metal coating 93 and/or an optional ceramic frit coating 95 applied prior to introduction of the MMO catalyst 62. The inner metallic substrate screen 91 is preferably an oxidation resistant alloy. The inner metallic substrate screen 91 is selected based on numerous factors, including catalyst bed operating temperatures (as determined by the concentration of peroxide 46) and the preferred form of the substrate (which includes wire meshes, tubes or corrugated sheets). Preferred inner metallic substrate screens 91 for use in high-concentration hydrogen peroxide propellant systems as shown in FIG. 1 include 16-wire mesh, Type 316 stainless steel screens that have high melting temperatures and oxidation resistance. Three preferred stainless steel substrate screens 91 that meet these criteria include CRES 316, CRES 347 and CRES 304, manufactured by Allegheny Ludlum. Another preferred metallic substrate is wire mesh screen of the nickel-based superalloy, Hastelloy C-276, manufactured by Haynes International. (All screens are available from Screen Technology Group, Inc. of Washougal, Wash.)

The noble metal intermediate 93, or strike, may be a noble metal or noble metal alloy and is used to bond the MMO catalyst 62 to the metallic substrate 91. The metal intermediate 93 maybe silver or a silver-palladium alloy. A ceramic coating 95 may be optionally added to the metallic substrate 91 prior to introducing the noble metal intermediate 93 depending upon the composition of the metallic substrate 91. The ceramic coating 95 is preferably introduced to provide oxidation protection for the metallic substrate 91 and to prevent alloying between the metallic substrate 91 and noble intermediate 93 during subsequent processing steps requiring high temperatures or during utilization with high concentration peroxide propellants. The ceramic coating 95 preferably is a chrome oxide containing enamel frit. Any enamel frit providing good oxidation prevention may be used. One preferred ceramic coating is Frit A-418, made by Ferro Corporation. In some embodiments of the active catalyst screen 36, the inner metallic substrate screen 91 is oxidation resistant and bonds well to the MMC catalyst 62. In these embodiments, the noble metal intermediate 93 and the ceramic coating 95 are not necessary and the prepared substrate screen 60 is simply the inner metallic substrate screen 91.

Referring again to FIG. 10, the prepared substrate screen 60 is coated with a mixed metal oxide (MMO) catalyst 62. The mixed metal oxide catalyst 30 of the present invention is a robust, high-activity catalyst for long duration use with up to about 99% concentration hydrogen peroxide propellant 46. As such, the catalyst 62 must have a melting temperature greater than the adiabatic decomposition temperature of the hydrogen peroxide propellant 46. Two preferred mixed metal oxide catalyst 62 compositions that achieve these desired results are Type I and Type II catalysts that are described in co-pending U.S. Application No. 10/405,419, which is herein incorporated by reference. In these catalyst 62 systems, silver (Type I) or a silver-palladium alloy (Type II) are the active catalysts, while manganese oxide and/or dysprosium oxide constitute co-catalysts (promoters). Alumina is also added to the formulation to enhance surface area, while borosilicate glass is added as a structural binder. One preferred borosilicate glass that may be utilized is Pyrex glass, available from Corning. Finally, gold is added as a promoter.

Figure 13:
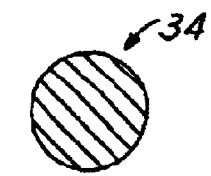
FIG. 13 is a section view of the thermal screens of FIG. 12 taken along line 13—13.
Figure 12:
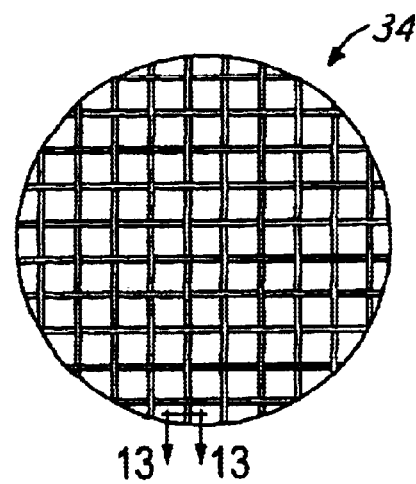
FIG. 12 is a section view of the thermal screens of FIG. 2 taken along line 12—12.

As best shown in FIGS. 12 and 13, the thermal screens 34 preferably are made of alloys that have high melting temperatures and oxidation resistance. Preferred screens 34 that meet these criteria include 8-wire mesh, Type 316 stainless steel such as CRES 316, CRES 347 and CRES 304, manufactured by Allegheny Ludlum. Another preferred thermal screen 34 is wire mesh screen of the nickel-based superalloy, Hastelloy C-276, manufactured by Haynes International. (All screens are available from Screen Technology Group, Inc. of Washougal, Wash.). Preferably, approximately fifty thermal screens 34 are stacked on top of the aft distribution plate 32.

Figure 14:
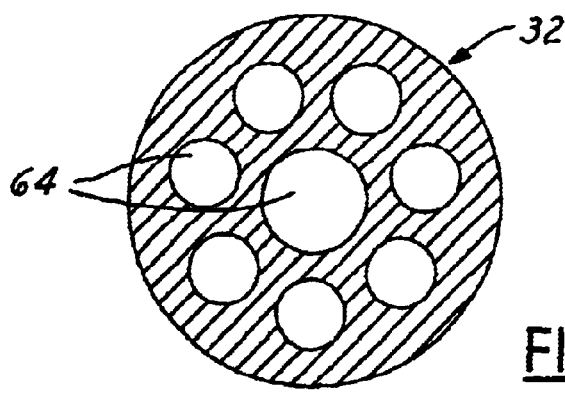
FIG. 14 is a section view of the aft distribution plate of FIG. 2 taken along line 14—14.

As best shown in FIG. 14, the aft distribution plate 32 has a series of holes 64 introduced through the plate thickness. The number, size and location of the holes 64 are designed to easily allow the high temperature gas 52 created within the MMO catalyst screens 36 and the thermal screens 34 to flow axially out of the catalyst cartridge housing 50 and into the outlet region 30 through outlet 53. Preferably, the cross-sectional area of the holes 64 is between approximately 15 and 60% of the total cross-sectional area of the aft distribution plate 32.

The following details how the above described gas generator assembly operates to decompose propellants such as hydrogen peroxide. Referring back to FIG. 1, the process of decomposing the hydrogen peroxide propellant 46 to a high temperature gas 52 is initiated by first introducing the liquid hydrogen peroxide propellant 46 to the gas generator assembly 10 through the inlet region 28. After passing through the inlet region 28, the hydrogen peroxide propellant 46 is decelerated in an inlet divergent cone 73. The liquid hydrogen propellant 46 enters the cartridge housing 50, through inlet 51. The propellant 46 then enters the diffuser section 41 and is diffused evenly through the catalyst cartridge 50 by the injector plate 42 and by the diffuser screens 40. The liquid hydrogen peroxide 46 then enters the silver initiator screen section 38 where adiabatic decomposition begins and a portion of the hydrogen peroxide propellant 46 is decomposed, raising the temperature of the remaining liquid hydrogen peroxide propellant 46. The propellant 46 then enters the active catalyst screen state 43. The novel catalyst material 62 contained on the active catalyst screens 36 decomposes most of the remaining hydrogen peroxide propellant 46, and the entire fluid is converted to vapor. The vapor then enters the thermal bed 34 where any remaining hydrogen peroxide 46 is decomposed into a high temperature gas 52. The high temperature gas 52 then flows axially through the aft distribution plate 32 and out of the cartridge housing 50 through outlet 53. The gas 52 subsequently accelerates through the converging nozzle section 80 of the gas generator housing 22 and exits the gas generator assembly 10 through the outlet region 30. The high temperature gas 52 is then used to drive gas turbines, provide thrust as a monopropellant, provide an oxidizer for bi-propellant systems, or function as an igniter for a rocket engine when combined with fuels like kerosene/air mixtures.

Of course, in systems not utilizing the cartridge 50, the process described is slightly different. The process of decomposing the hydrogen peroxide propellant 46 to a high temperature gas 52 is initiated by first introducing the liquid hydrogen peroxide propellant 46 to the gas generator assembly 10 through the inlet region 28. After passing through the inlet region 28, the hydrogen peroxide propellant 46 is decelerated in an inlet divergent cone 73. The liquid hydrogen propellant 46 enters the catalyst bed 63. The propellant 46 then enters the diffuser section 41 and is diffused evenly through catalyst bed 63 by the injector plate 42 and by the diffuser screens 40. The liquid hydrogen peroxide 46 then enters the silver initiator screen section 38 where adiabatic decomposition begins and a portion of the hydrogen peroxide propellant 46 is decomposed, raising the temperature of the remaining liquid hydrogen peroxide propellant 46. The propellant 46 then enters the active catalyst screen stack 43. The novel catalyst material 62 contained on the active catalyst screens 36 decomposes most of the remaining hydrogen peroxide propellant 46, and the entire fluid is converted to vapor. The vapor then enters the thermal screens 34 where any remaining hydrogen peroxide 46 is decomposed into a high temperature gas 52. The high temperature gas 52 then flows axially through the aft distribution plate 32. The gas 52 subsequently accelerates through the converging nozzle section 80 of the gas generator housing 22 and exits the gas generator assembly 10 through the outlet region 30.

The catalyst bed designs and assemblies 10 as described above can be used in other propellant decomposition systems. For example, the Type II catalyst 62, applied to a metallic substrate 60, has been used in the catalytic combustion of methane.

While the invention has been described in terms of preferred embodiments, it will be understood, of course, that the invention is not limited thereto since modifications may be made by those skilled in the art, particularly in light of the foregoing teachings.

What is claimed is:

1. A robust, long-life gas generator assembly for use in high temperature decomposition of a propellant, including 70–99% hydrogen peroxide, comprising
   an inlet adapter having an inlet region;
   a housing coupled to said inlet adapter and having an outlet region;
   a catalyst bed coupled within said housing and between said inlet region and said outlet region, said catalyst bed having a diffuser section and an active catalyst screen stack and an initiator section, said active catalyst screen stack and said initiator section being made of distinctly different materials and each consisting of alternating active and inactive screens, wherein said active catalyst screen stack being located between said diffuser section and said outlet region.

2. The gas generator of claim 1, further comprising a catalyst bed cartridge coupled within said housing between said inlet region and said outlet region, said catalyst bed cartridge having an inlet and an outlet, wherein said catalyst bed is contained within said catalyst bed cartridge between said inlet and said outlet.

3. The gas generator assembly of claim 1, wherein said diffuser section comprises an injector plate and a plurality of diffuser screens, wherein said injector plate is located between said inlet region and said plurality of diffuser screens.

4. The gas generator assembly of claim 3, wherein said injector plate has a plurality of injector plate holes aligned with the axis of flow of propellant through said catalyst bed, said plurality of injector plate holes designed to decelerate and evenly distribute the propellant throughout said catalyst bed as the propellant moves from said inlet region to said plurality of diffuser screens.

5. The gas generator assembly of claim 4, wherein the cumulative cross sectional area of said plurality of injector plate holes comprises between 5 and 35 percent of the total cross sectional area of said injector plate.

6. The gas generator assembly of claim 3, wherein each of said plurality of diffuser screens comprise a wire mesh material designed to further decelerate and further distribute said propellant within said catalyst bed as the propellant moves from said inlet region to said active catalyst screen stack.

7. The gas generator assembly of claim 1, wherein said active catalyst screen stack comprises a plurality of coated inner metallic wire substrate screens, each of said plurality of coated inner metallic wire substrate screens comprising a inner metallic wire substrate screen surrounded by a mixed metal oxide catalyst material.

8. The gas generator assembly of claim 7, wherein said active catalyst screen stack further comprises a plurality of inner metallic wire substrate screens coupled between each of said coated inner metallic wire substrate screens.

9. The gas generator assembly of claim 7, wherein said mixed metal oxide catalyst material is selected from the group consisting of a Type I silver mixed metal oxide catalyst material and a Type II silver-palladium mixed metal oxide catalyst material.

10. The gas generator assembly of claim 1, wherein said initiator section comprises not more than fifteen alternating pairs of a silver-plated mesh screen and an inactive metal mesh screen.

11. The gas generator assembly of claim 1, wherein said initiator section comprises not more than fifteen alternating pairs of a wrought silver mesh screen and an inactive metal mesh screen.

12. The gas generator assembly of claim 1, wherein said catalyst bed further comprises an aft distribution plate coupled between said active catalyst screen stack and said outlet region, wherein the aft distribution plate has a plurality of holes through said aft distribution plate thickness, wherein said holes are aligned with the axis of flow of propellant through said catalyst bed, and wherein the cumulative cross sectional area of said plurality of holes comprises between 15 and 60 percent of the total cross sectional area of said aft distribution plate.

13. The gas generator assembly of claim 1, wherein said catalyst bed further comprises a plurality of thermal bed screens located between said active catalyst section and said outlet region.

14. A robust, long-life gas generator assembly for use in high temperature decomposition of a propellant, including 70–99% hydrogen peroxide, comprising an inlet adapter having an inlet region;
a housing coupled to said inlet adapter and having an outlet region;
a catalyst bed coupled within said housing and between said inlet region and said outlet region, said catalyst bed having an initiator section and an active catalyst screen stack, wherein said active catalyst screen stack being located between said initiator section and said outlet region and wherein said initiator section decomposes a small portion of the propellant to a high temperature gas as the propellant passes from said inlet to said active catalyst screen stack, said active catalyst screen stack and said initiator section being made of distinctly different materials and each consisting of alternating active and inactive screens.

15. The gas generator of claim 14, further comprising a catalyst bed cartridge coupled within said housing between said inlet region and said outlet region, said catalyst bed cartridge having an inlet and an outlet, wherein said catalyst bed is contained within said catalyst bed cartridge between said inlet and said outlet.

16. The gas generator assembly of claim 14, wherein said initiator section comprises not more than fifteen alternating pairs of a silver-plated mesh screen and an inactive metal mesh screen.

17. The gas generator assembly of claim 14, wherein said initiator section comprises not more than fifteen alternating pairs of a wrought silver mesh screen and an inactive metal mesh screen.

18. The gas generator assembly of claim 14, wherein said active catalyst screen stack comprises a plurality of coated inner metallic wire substrate screens, each of said plurality of coated inner metallic wire substrate screens comprising a inner metallic wire substrate screen surrounded by a mixed metal oxide catalyst material.

19. The gas generator assembly of claim 18, wherein said active catalyst screen stack further comprises a plurality of inner metallic wire substrate screens coupled between each of said coated inner metallic wire substrate screens.

20. The gas generator assembly of claim 18, wherein said mixed metal oxide catalyst material is selected from the group consisting of a Type I silver mixed metal oxide catalyst material and a Type II silver-palladium mixed metal oxide catalyst material.

21. The gas generator assembly of claim 14, wherein said catalyst bed further comprises a diffuser section coupled between said inlet region and said initiator section, said diffuser section designed to decelerate and evenly distribute the propellant throughout said catalyst bed as it passes from said inlet region towards said initiator section.

22. The gas generator assembly of claim 21, wherein said diffuser section comprises an injector plate and a plurality of diffuser screens, wherein said injector plate is located between said inlet and said plurality of diffuser screens.

23. The gas generator assembly of claim 22, wherein said injector plate has a plurality of injector plate holes aligned with the axis of flow of propellant through said catalyst bed, said plurality of injector plate holes designed to decelerate and evenly distribute the propellant throughout said catalyst bed as the propellant moves from said inlet region towards said plurality of diffuser screens.

24. The gas generator assembly of claim 23, wherein the cumulative cross sectional area of said plurality of injector plate holes comprises between 5 and 35 percent of the total cross sectional area of said injector plate.

25. The gas generator assembly of claim 22, wherein each of said plurality of diffuser screens comprise a wire mesh material designed to further decelerate and further distribute said propellant within said catalyst bed prior to decomposition within said active catalyst screen stack.

26. The gas generator assembly of claim 14, wherein said catalyst bed further comprises an aft distribution plate coupled between said active catalyst screen stack and said outlet region, wherein the aft distribution plate has a plurality of holes through said aft distribution plate thickness, wherein said holes are aligned with the axis of flow of propellant through said catalyst bed, and wherein the cumulative cross sectional area of said plurality of holes comprises between 15 and 60 percent of the total cross sectional area of said aft distribution plate.

27. The gas generator assembly of claim 14, wherein said catalyst bed further comprises a plurality of thermal bed screens located between said active catalyst section and said outlet region.

28. A method for forming a catalyst bed cartridge for use in a gas generator assembly used for high temperature decomposition of propellants comprising:

providing a catalyst bed cartridge having an inlet and an outlet;
securing an aft distribution plate to said catalyst bed cartridge near said outlet;
introducing an active catalyst screen stack to said catalyst bed cartridge between said inlet and said aft distribution plate, said active catalyst screen stack having a plurality of alternating pairs of an active catalyst screen and an inactive catalyst screen;
introducing not more than fifteen pairs of a silver initiator screen stack to said catalyst cartridge between said inlet and said active catalyst screen stack, each of said not more than fifteen pairs of a silver initiator screen stack consisting of a silver initiator screen and an inactive initiator screen; and
introducing a diffuser section between said not more than fifteen pairs of said silver initiator screen stack and said inlet, said diffuser section used to distribute the propellant throughout said catalyst bed cartridge as the propellant passes from said inlet to said outlet.

29. The method of claim 28 further comprising introducing a plurality of thermal bed screens between said aft distribution plate and said active catalyst screen stack, wherein one of said plurality of thermal bed screens is clocked between one and twenty degrees in a first direction relative to an next adjacent one of said plurality of thermal screens.

30. The method of claim 28, wherein each of said active catalyst screens is clocked between one and twenty degrees in a first direction relative to an adjacent one of said plurality of inactive catalyst screens.

31. The method of claim 28, wherein introducing a diffuser section comprises:

introducing a plurality of diffuser screens between said fifteen pairs of said silver initiator screen stack and said inlet; and
coupling an injector plate to said catalyst bed cartridge between said inlet and said plurality of diffuser screens.

32. The method of claim 31, wherein one of said plurality of diffuser screens is clocked between one and twenty degrees in a first direction relative to an adjacent one of said plurality of diffuser screens.

33. A method for decomposing a propellant, including 70–99% hydrogen peroxide, used to drive a gas turbine, provide thrust as a monopropellant, provide an oxidizer for bi-propellant systems, or function as an igniter for a rocket engine, the method comprising (a) forming a generator assembly comprising:
    an inlet adapter having an inlet region;
    a housing coupled to said inlet adapter and having an outlet region; and
    a catalyst bed coupled within said housing and between said inlet region and said outlet region, said catalyst bed having a diffuser section and an active catalyst screen stack and an initiator section, said active catalyst screen stack and said initiator section being made of distinctly different materials and each consisting of alternating active and inactive screens, wherein said active catalyst screen stack being located between said diffuser section and said outlet region;

(b) introducing a quantity of propellant within said inlet region of said generator assembly;

(c) passing said quantity of propellant over said catalyst bed, said catalyst bed decomposing said quantity of propellant to form a second quantity of a high temperature gas; and (d) removing said second quantity of a high temperature gas from said generator assembly through said outlet region.

34. The method of claim 33, said generator assembly further comprising a catalyst bed cartridge coupled within said housing between said inlet region and said outlet region, said catalyst bed cartridge having an inlet and an outlet, wherein said catalyst bed is contained within said catalyst bed cartridge between said inlet and said outlet.

35. The method of claim 33, wherein said diffuser section comprises an injector plate and a plurality of diffuser screens, wherein said injector plate is located between said inlet region and said plurality of diffuser screens.

36. The method of claim 35, wherein said injector plate has a plurality of injector plate holes aligned with the axis of flow of propellant through said catalyst bed, said plurality of injector plate holes designed to decelerate and evenly distribute said quantity of propellant throughout said catalyst bed as said quantity of propellant moves from said inlet region to said plurality of diffuser screens.

37. The method of claim 36, wherein the cumulative cross sectional area of said plurality of injector plate holes comprises between 5 and 35 percent of the total cross sectional area of said injector plate.

38. The method of claim 35, wherein each of said plurality of diffuser screens comprise a wire mesh material designed to further decelerate and further distribute said quantity of said propellant within said catalyst bed as said quantity of said propellant moves from said inlet region to said active catalyst screen stack.

39. The method of claim 33, wherein said active catalyst screen stack comprises a plurality of coated inner metallic wire substrate screens, each of said plurality of coated inner metallic wire substrate screens comprising a inner metallic wire substrate screen surrounded by a mixed metal oxide catalyst material.

40. The method of claim 33, wherein said active catalyst screen stack further comprises a plurality of inner metallic wire substrate screens coupled between each of said coated inner metallic wire substrate screens.

41. The method of claim 39, wherein said mixed metal oxide catalyst material is selected from the group consisting of a Type I sliver mixed metal oxide catalyst material and a Type II silver-palladium mixed metal oxide catalyst material.

42. The method of claim 33, wherein said initiator section comprises not more than fifteen alternating pairs of a silver-plated mesh screen and an inactive metal mesh screen.

43. The method of claim 33, wherein said initiator section comprises not more than fifteen alternating pairs of a wrought silver mesh screen and an inactive metal mesh screen.

44. The method of claim 33, wherein said catalyst bed further comprises an aft distribution plate coupled between said active catalyst screen stack and said outlet region, wherein the aft distribution plate has a plurality of holes through said aft distribution plate thickness, wherein said holes are aligned with the axis of flow of said quantity of said propellant through said catalyst bed, and wherein the cumulative cross sectional area of said plurality of holes comprises between 15 and 60 percent of the total cross sectional area of said aft distribution plate.

45. The method of claim 33, wherein said catalyst bed further comprises a plurality of thermal bed screens located between said active catalyst section and said outlet region.

* * * * *